United States Patent

Ullrich et al.

Patent Number: 6,112,365

Date of Patent: *Sep. 5, 2000

[54] WIPER BLADE FOR CLEANING WINDOW GLASS OF MOTOR VEHICLES

[75] Inventors: Jürgen Ullrich, Schwieberdingen; Wilfried Merkel, Kappelrodeck; Gerd Kuehbauch, Buehlertal; Karlheinz Lorenz, Baden-Baden; Josef Berger, Wolfschlugen; Michael Schulze, Nufringen; Norbert Wegner, Buehl; Jürgen Mayer, Gaggenau, all of Germany

[73] Assignee: Robert Bosch GmbH, Stuttgart, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/801,012

[22] Filed: Feb. 19, 1997

Related U.S. Application Data

[63] Continuation of application No. PCT/DE96/01012, Jun. 11, 1996.

[30] Foreign Application Priority Data

Jun. 20, 1995 [DE] Germany ............................ 195 22 273

[51] Int. Cl.[7] ...................................................... B60S 1/38
[52] U.S. Cl. ............................... 15/250.454; 15/250.451; 15/250.48
[58] Field of Search ....................... 15/250.451, 250.452, 15/250.453, 250.454, 250.48, 250.44, 250.46, 250.361, 250.47

[56] References Cited

U.S. PATENT DOCUMENTS

| 2,700,785 | 2/1955 | Oishei et al. | 15/250.454 |
|---|---|---|---|
| 4,123,817 | 11/1978 | Hortery | 15/250.48 |
| 5,231,730 | 8/1993 | Schmid et al. | 15/250.452 |
| 5,412,834 | 5/1995 | Burkard et al. | 15/250.453 |
| 5,462,707 | 10/1995 | Nagy | 15/250.48 |
| 5,661,871 | 9/1997 | Scorsiroli | 15/250.452 |

FOREIGN PATENT DOCUMENTS

| 2 267 909 | 11/1975 | France . |
|---|---|---|
| 1 430 338 | 7/1972 | Germany . |
| 43 20 637 A1 | 1/1995 | Germany . |
| 43 25 601 A1 | 2/1995 | Germany . |
| 2 066 655 | 7/1981 | United Kingdom . |

*Primary Examiner*—Gary K. Graham
*Attorney, Agent, or Firm*—Michael J. Striker

[57] ABSTRACT

A wiper blade for cleaning window glass of motor vehicles, comprising an elongated support frame provided with retaining claws, an elongated wiper strip composed of an elastic material and having a head strip grasped by the retaining claws, the head strip being provided with a longitudinal channel which is closed around and opens at end faces of the wiper strip, a spring rail located in the longitudinal channel and fixed against longitudinal shifting, a retaining unit fixing the spring rail against the longitudinal shifting, a unit mounted on the wiper strip so as to cooperate with the frame part and to secure the wiper strip in captive fashion on the support frame, the spring rail being retained by a positive engagement in the longitudinal channel, the securing unit being firmly connected to the wiper strip.

13 Claims, 5 Drawing Sheets

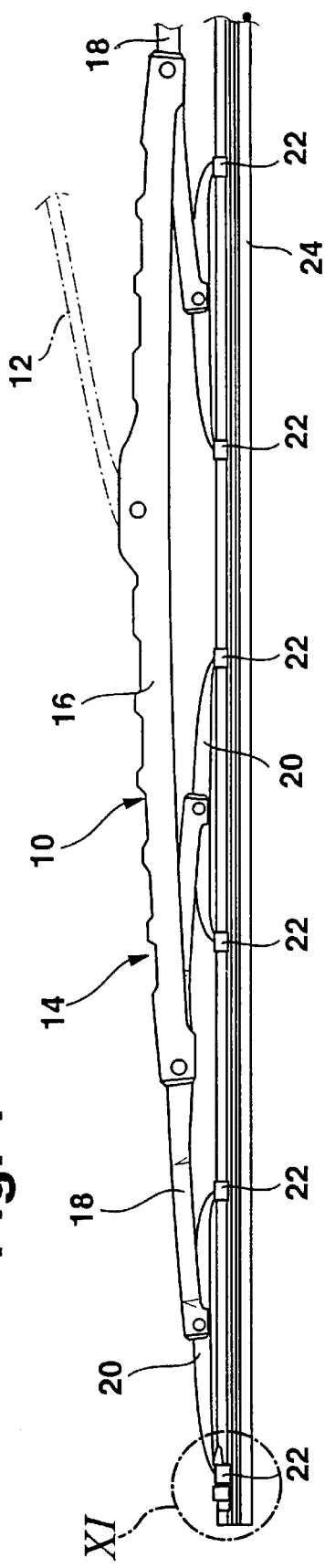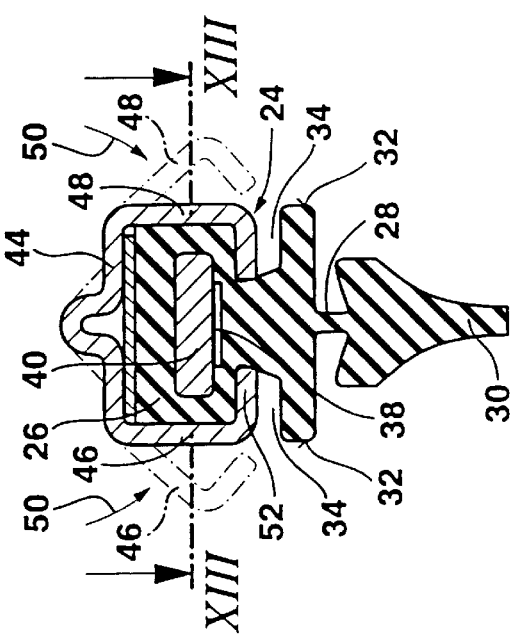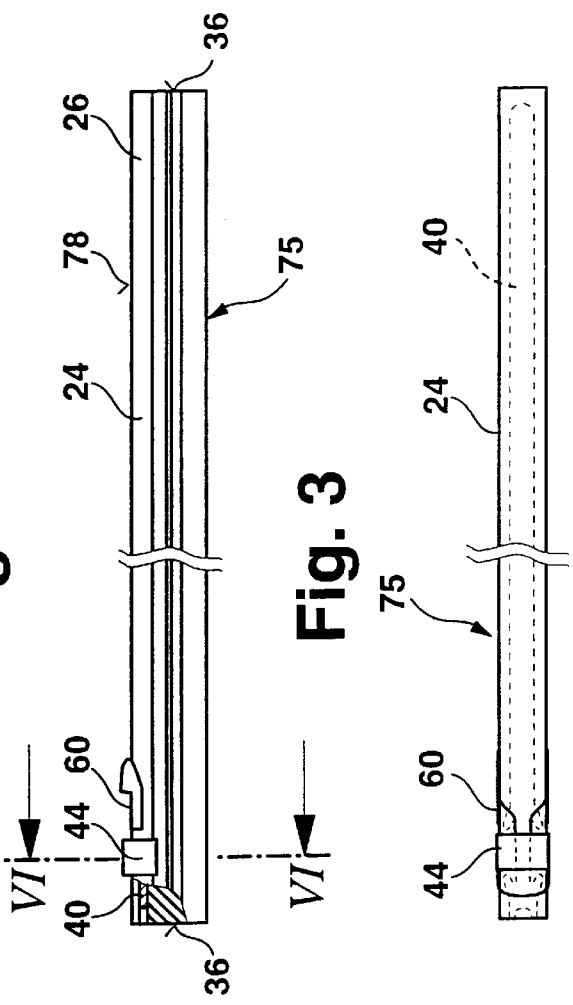

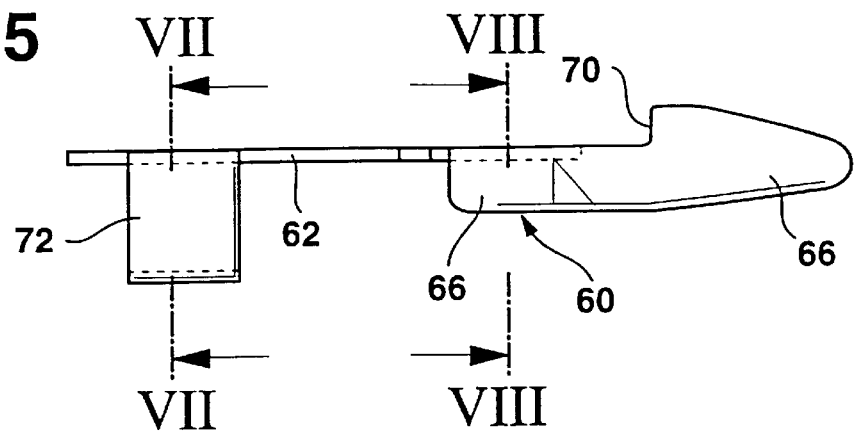
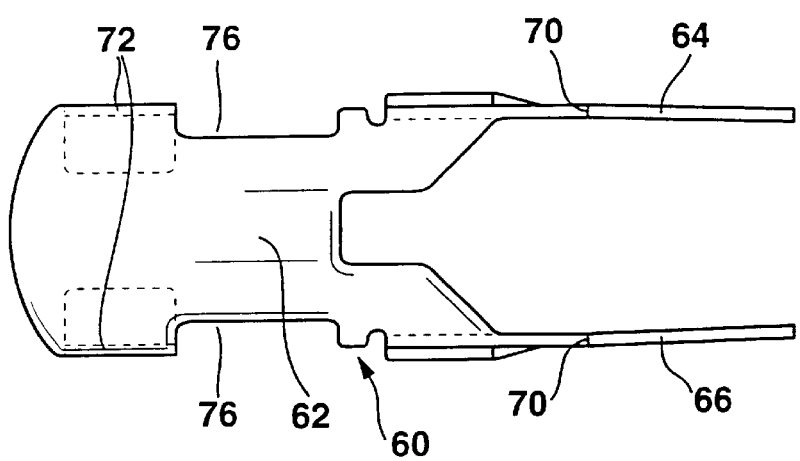
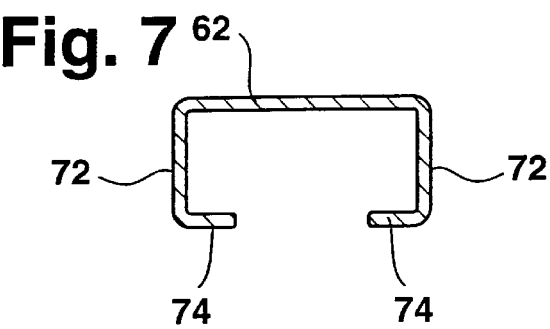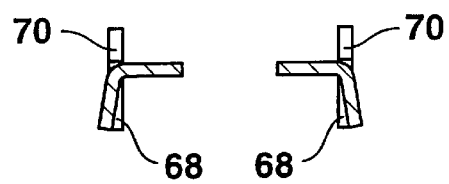
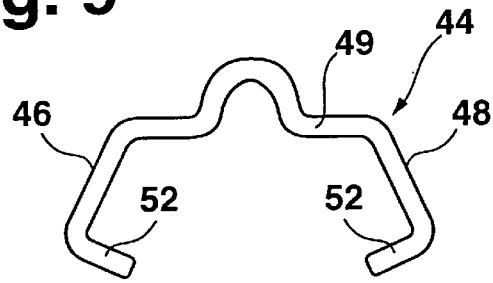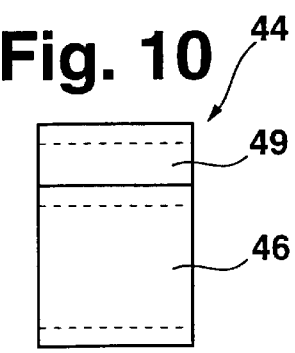

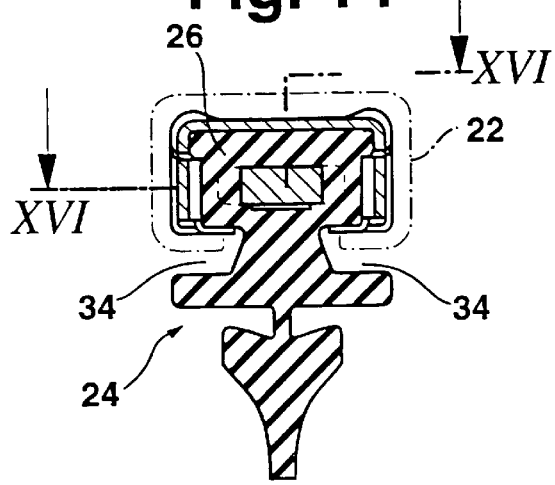
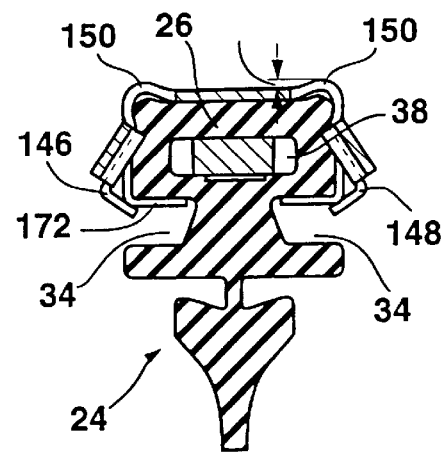
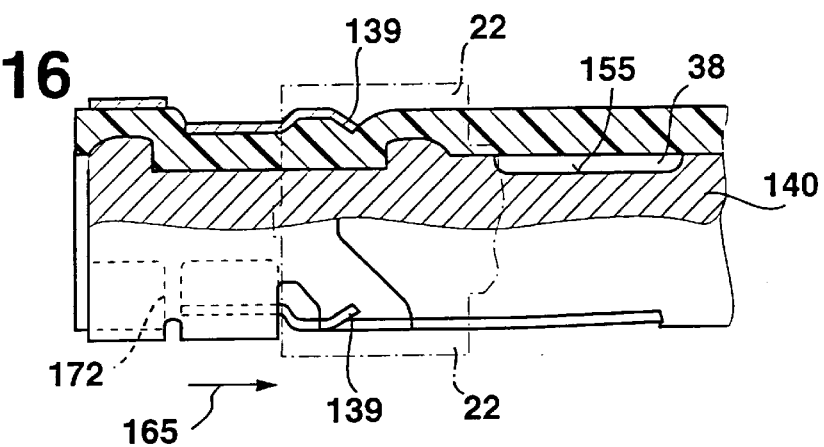
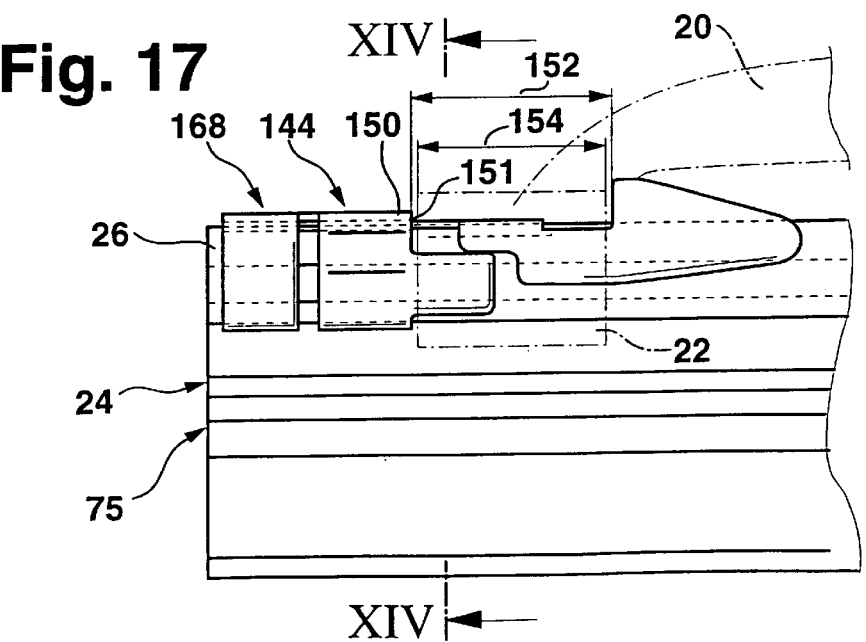

WIPER BLADE FOR CLEANING WINDOW GLASS OF MOTOR VEHICLES

This application is a continuation of PCT/DE96/01012 filed Jun. 11, 1996 published as WO 97/00796 on Jan. 9, 1997.

BACKGROUND OF THE INVENTION

In commercially available windshield wiper blades with a supporting frame for the wiper strip, the strip suffers unavoidable wear that reduces the quality of cleaning accomplished, so the wiper blade has to be replaced from time to time. However, since the supporting bracket frame of the wiper blade is as a rule still fully functional at that time, for reasons of cost a so-called refill set is offered to the final user; it includes a wiper strip, two spring rails to be accommodated in facing longitudinal grooves of the wiper strip, and a securing clamp. This refill set can be inserted, after the removal of the corresponding original parts, into the retaining claws of the frame parts; the securing clamp secures the spring rails in the wiper strip on the one hand and also, with elastically deflectable spring arms and hooks disposed on them, anchors the wiper strip together with the spring rails to the supporting bracket frame. An embodiment of this kind is known from German Published, Examined Patent Application DE-AS 14 30 338.

In the wiper blade of the invention, however, only a single spring rail—instead of the two outer spring rails—is accommodated in a longitudinal channel that is closed all the way around and is disposed in the head strip of the wiper strip. To secure against longitudinal shifting of the spring rail, in a known wiper blade (French Patent Application FR 2 267 909) of this generic type, the spring rail has been made shorter than the wiper strip and provided with a dovetail-like recess on both ends, into which recess tablike extensions of end plates that fit the recess are inserted; these extensions protrude partway beyond the cross section of the head strip and thus assure that the wiper strip, inserted into the claws of the supporting bracket frame, cannot shift out of the claws longitudinally during wiper operation. The protruding regions of the end plates also assure that the wiper strip is secured on the supporting bracket frame. Accordingly, the final user is given four individual parts that he has to then mount by himself. Mounting the second end plate is especially difficult, because the extension thereof cannot be introduced into the recess of the spring rail until the applicable end thereof—after the longer, elastic wiper strip is pressed backward, is exposed.

SUMMARY OF THE INVENTION

In the wiper blade of the invention, the premounted refill set—after removal of the complete old wiper strip—need merely be inserted into the existing support frame and anchored to the frame with the aid of a securing means. This is made possible on the one hand by the positive-engagement connection between the spring rail and wiper strip, and on the other by the fixed disposition of the securing means on the wiper strip, so that the refill set is made available to the end user in the form of a single, fully assembled component.

Easy locking to prevent longitudinal shifting of the spring rail in the longitudinal channel is obtained if the spring rail, on at least one long side, has a recess into which the channel wall adjacent to it protrudes.

In a further feature of the invention it is proposed that clamping means extending crosswise to the longitudinal extent of the wiper strip press the channel wall into the recess. This facilitates mounting of the spring rail, because the mounting is done before the clamping means are attached.

An economical type of the clamping means is attained if they are embodied by a clamp which grasps the head strip of the wiper strip, and whose legs extending substantially parallel to one another press the lateral channel walls that face one another together.

Such a clamp can at the same time serve to fasten the securing means to the wiper strip, if between a base part of the clamp that connects the clamp legs and the upper surface of the head strip oriented toward the base part, a spring clamp is disposed and firmly retained, which with at least one elastically deflectable arm crosses a retaining claw of the support frame and engages it from behind with a hook present on the arm.

For guidance of the spring clamp in the prescribed way along the wiper strip, extensions that grasp the two side walls of the head strip and with ends facing one another engage peripherally open longitudinal grooves of the wiper strip are disposed on a platelike body of the spring clamp that rests on the upper surface of the head strip.

For fixing the spring clamp to the wiper strip, the platelike body has recesses facing one another, in which the legs of the tension clamp cross the spring clamp.

To secure the refill set to the support frame, this set including the wiper strip, spring rail, tension clamp and securing clamp, the elastically deflectable arm of the spring clamp is formed by a cheek of the platelike body adjacent to the one side wall of the head strip and extending longitudinally of the wiper strip, on the free end of which cheek, the hook cooperating with the retaining claw of the support frame is disposed.

The cheek is located expediently in a plane in which the one extension of the body is located.

A spring clamp that can be made especially economically is obtained if it is embodied integrally with its extensions and the arm having the hook and is produced from spring band steel.

It is also conceivable, for disposing the refill set on the support frame in an especially operationally secure way, that the spring clamp has two cheeks, extending parallel to one another and adjacent to the two side faces of the head strip, the cheeks forming two hook arms.

If the clamp is produced from a deformable metal, then it is especially well suited for deforming the head strip in the region of the recess in the spring rail.

An especially simple version, because it has only a few components, is obtained if a spring clamp is integrally joined to the tension clamp to form a combination part, and the spring clamp, with at least one elastically deflectable arm, crosses a retaining claw of the support frame and engages it from behind with a hook present on the arm.

If the combination part has a platelike base part, on which the arms of the spring clamp are disposed; that viewed in the mounting direction of the combination part this part has a guide clamp preceding the arms; and between the guide clamp and the arms of the combination part, a tension clamp is disposed, which at least intermittently grasps the head strip of the wiper strip, and whose legs extending substantially parallel to one another press the lateral channel walls, facing one another, into the recesses of the spring rail, a compact arrangement that can be mounted economically is obtained.

In a further feature of the invention, one tab extending in the mounting direction is disposed on each of the legs of the tension clamp that laterally embrace the head strip of the wiper strip; the retaining claws of the support frame fit over the tabs when the refill set has been mounted. As a result, without particular production and assembly effort, securing against spring open of the tension clamp is attained, because the tabs are firmly held by the claws in their prescribed mounting position.

To compensate for play between the refill set and the supporting bracket frame, the tab is curved outward out of the plane of the legs; the free end of the tab forms an inward-pointing running face, which makes it easier to introduce the refill set into the supporting bracket frame.

To secure the refill set on the supporting bracket frame, the platelike base part of the combination part, in the region of the legs of the tension clamp, has at least one bulge, whose end edge is oriented toward the hook; the spacing between the end edge and the hook shoulder edge is adapted to the length of the retaining claw of the support frame. As a result, the retaining claw of the supporting bracket frame comes to rest between the facing edges of the bulge and of the hook shoulder, thus precluding unintentional detachment of the refill set from the supporting bracket frame.

Other advantageous features of the invention can be found in the ensuing description and the drawing of the exemplary embodiments of the invention.

BRIEF DESCRIPTION OF THE DRAWINGS

In the drawing, FIG. 1 shows a fragmentary view of a wiper blade embodied according to the invention; FIG. 2 is a side view of a refill set belonging to the wiper blade, on a larger scale; FIG. 3 shows a plan view of the refill set of FIG. 2; FIG. 4 is a section through the refill set taken along the line IV—IV of FIG. 2, on a larger scale; FIG. 5 is a side view on a larger scale of a securing spring belonging to the refill set of FIG. 2; FIG. 6 is a plan view of the securing spring of FIG. 5; FIG. 7 is a section through the securing spring along the line VII—VII of FIG. 5; FIG. 8 is a section through the securing spring along the line VIII—VIII of FIG. 5; FIG. 9 is a plan view on a tension clamp, belonging to the refill set of FIG. 2, on a larger scale; FIG. 10 is a side view of the tension clamp of FIG. 9; FIG. 14 is a section in accordance with FIG. 4 through a different embodiment of the invention, mounted ready for operation; FIG. 15 shows the arrangement of FIG. 14, in which the tension clamp, embodied integrally with the spring clamp, is still open in a premounting position; FIG. 16 is a plan view on one end of the wiper blade of this second embodiment, shown in section in half the drawing along the line XVI—XIV of FIG. 17; FIG. 17 shows a side view of the one end of the wiper blade in accordance with this second embodiment.

DESCRIPTION OF THE PREFERRED EMBODIMENT

Figure 11:
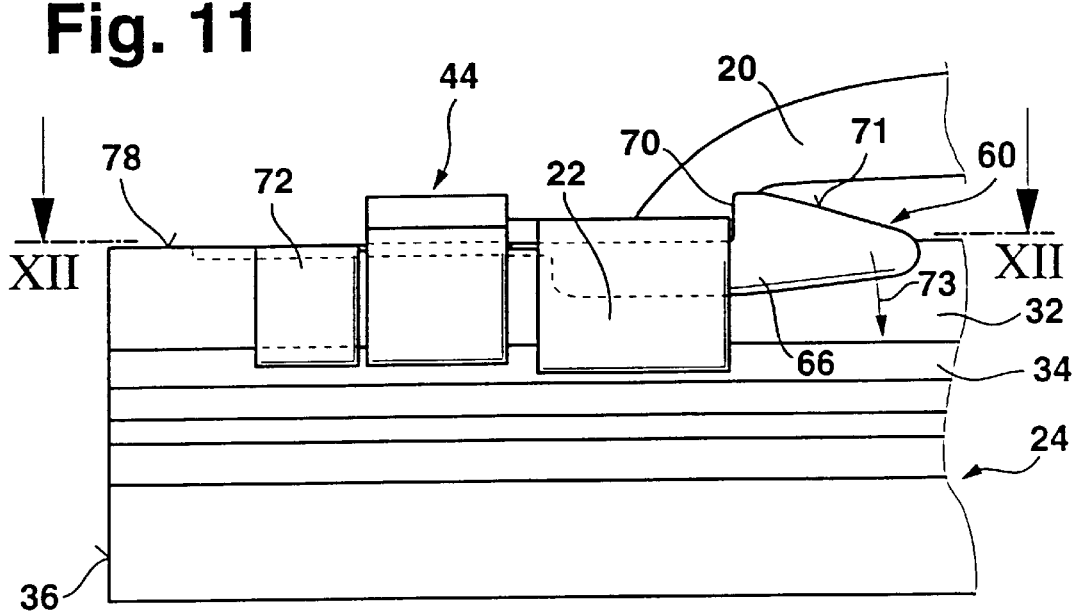
FIG. 11 is an enlarged view of a detail marked XI in FIG. 1.

A wiper blade 10, shown partly in front view in FIG. 1, is part of a wiper apparatus, not shown in further detail, of a motor vehicle. The wiper blade is moved over a window of the motor vehicle that has to be wiped by means of a driven wiper arm 12 shown in dot-dashed lines in FIG. 1. The wiper blade 10 in the exemplary embodiment includes a multiple-member support frame 14, which is designed as a support bracket system. That is, to the ends of a main bracket 16 pivotably connected to the wiper arm, intermediate brackets 18 are pivotally attached, and claw brackets 20 are pivotably connected to the ends of the intermediate brackets, on their ends, these brackets in turn have claws 22 for grasping a wiper strip 24 made of an elastic rubberlike material. Both the wiper strip and the support frame 14 are embodied in elongated fashion (FIG. 1).

Figure 13:
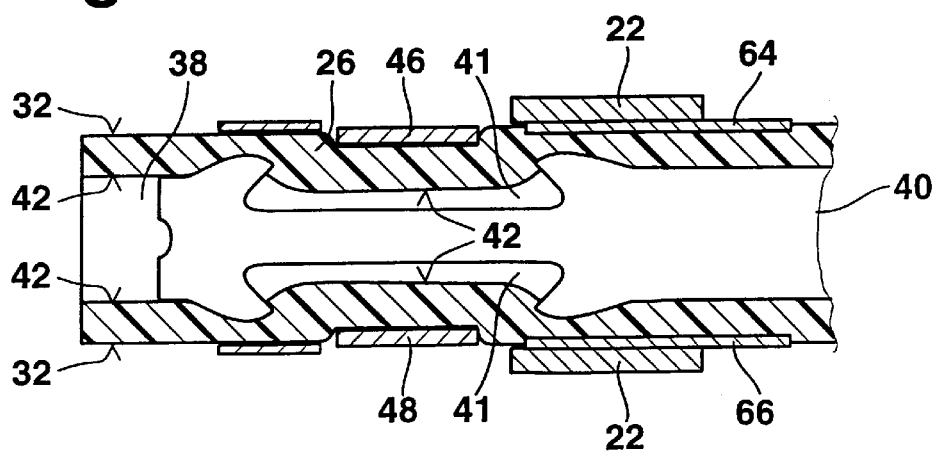
FIG. 13 is a section taken along the line XIII—XIII of FIG. 4.

As FIG. 4 shows, the wiper strip 24 has a head strip 26, which is joined via a tilting strut 28 to a wiper lip 30 resting on the window to be washed. Longitudinal grooves 34 are disposed facing one another on the two long side faces 32 of the head strip 26, and the retaining claws 22 of the claw brackets 20 engage these grooves in a known manner. Since the longitudinal grooves 34 open out at the two end faces 36 of the wiper strip 24, they can be thrust into the retaining claws 22 of the claw brackets 20 in their longitudinal direction without difficulties. In order to achieve proper distribution of the contact pressure of the wiper blade or of the wiper strip 24 on the window to be wiped, a longitudinal channel 38 (FIG. 13), closed all the way around and opening out at the two end faces 36 of the wiper strip 24, is disposed in the head strip 26, and an elongated spring rail 40 (FIGS. 4 and 13) is accommodated in this channel. Hence the channel walls 42 protrude with positive engagement into the recesses 41 of the spring rail 40. To secure the spring rail 40 in the longitudinal channel 38 of the head strip 26, the spring rail 40 is provided, on one end region thereof, with two opposed lateral peripherally open recesses 41, into each of which portions of the opposed channel walls 42 are pressed with the aid of a tension clamp 44 (FIGS. 4 and 13). The tension clamp 44 itself is shown as an individual part in FIGS. 9 and 10. After the spring rail 40 has been inserted into the longitudinal channel 38, the tension clamp is thrust longitudinally onto the head strip 26 of the wiper strip 24, until its legs 46 and 48, shown in dot-dashed lines in FIG. 4, rest above the recesses 41 of the spring rail 40. After that, their arms are pressed inward in the direction of the arrows 50 in FIG. 4, so that with hooks 52 disposed on their free ends, they engage the longitudinal grooves 34 of the head strip 26 (FIG. 4). The clamp 44 is adapted in its dimensions to the head strip 26 in such a way that after the deformation (arrows 50) has ended, the clamp, with its legs 46 and 48, presses the channel walls 42 into the recesses 41 of the spring rail 40, thereby assuring an absolute positive-engagement securing of the spring rail 40 in the longitudinal channel 38 against longitudinal shifting. The clamp 44 accordingly presses the channel walls 42 toward one another, crosswise to the longitudinal direction of the wiper strip 24, and presses them into the recesses 41, so that together with these recesses 41 the clamp represents a retaining means to secure the spring rail 40 on the wiper strip 24.

Now in order to secure the wiper strip 24 against excessive longitudinal shifting relative to the support frame 14, a spring clamp 60 (FIG. 11) acting as a securing means and made from a spring collar steel is disposed on the wiper strip 24. The spring clamp 60 is shown in FIGS. 5–8. It has a platelike base part 62, from which arms 64 and 66 extend, parallel to and spaced apart from one another. These arms 64 and 66 are angled by approximately 90° relative to the base part 62, resulting in lateral cheeks 68, which on their free ends are provided with a hook 70, and these hooks protrude beyond the plane in which the platelike body 62 of the spring clamp 60 is located. Extensions 72 are also formed onto the platelike base part 62 of the spring clamp 60 and are located in substantially the same plane as that in which the cheeks 64 and 66 of the spring clamp 60 are located. The ends 74 of the extensions 72 are oriented toward one another and are dimensioned such that when the spring clamp 60 is mounted, they likewise engage the longitudinal grooves 34 of the head strip 32. In a middle portion between the two opposed extensions 72 and the two opposed spring arms 64 and 66 of the spring clamp 60, the platelike vase part 62 thereof is provided with two opposed recesses 76, whose dimensions are adapted to the clamp legs 46 and 48 of the tension clamp 44.

Figure 12:
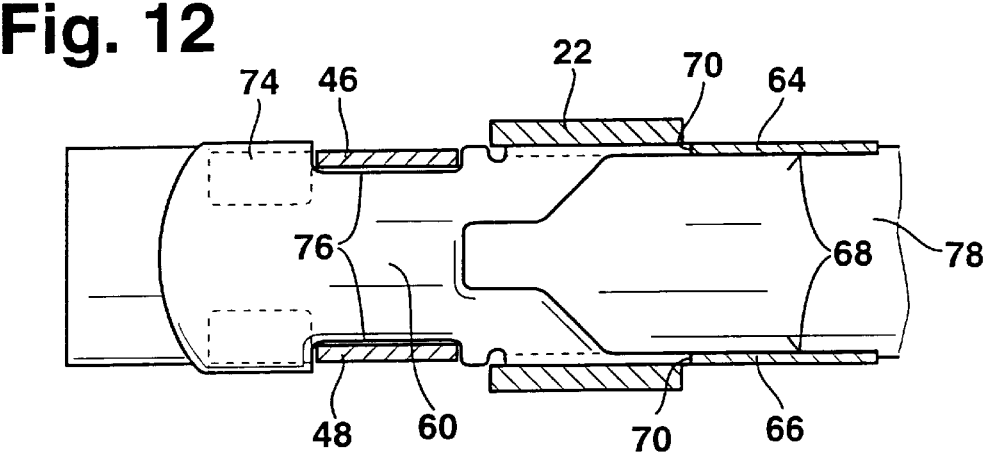
FIG. 12 is a section taken along the line XII—XII:of FIG. 11.

FIGS. 11 and 12 in particular show that the spring clamp 60 rests with its platelike base part 62 on the upper surface 78 of the head strip 26 of the wiper strip 24. The extension 72, with their ends 74 pointing toward one another, grasp a portion of the head strip 26 and engage the longitudinal grooves 34 of the wiper strip 24 that is provided with the spring rail 40. After that, the tension clamp 44 is put into its prescribed position, and the clamp legs 46 and 48 are pressed together in the direction of the arrows 50 (FIG. 4) in such a way that they reach their position shown in FIGS. 4, 11, 12 and 13. As a result, the securing of the spring rail 40 against longitudinal shifting in the longitudinal channel 38 of the head strip 26, already described, is attained and moreover, at the same time, securing against longitudinal shifting for the spring clamp 60 relative to the wiper strip 24 is obtained, since the clamp legs 46 and 48 enter the recesses 76 in the platelike body 62 of the spring chamber 60 and cross it. The base part 62 of the spring clamp 60 now rests between a crossbar 49 of the tension clamp 44 that joins the clamp legs 46, 48, and the upper surface 78 toward the tension clamp of the head strip 26. This preassembly is performed as long as the wiper strip 24 is still not yet disposed on the support frame 14. Once the above-described preassembly is completed, the result is a mounting set that includes the wiper strip 24, the spring rail 40, the spring clamp 60, and the tension clamp 44 (FIGS. 2 and 3). The result is accordingly an assembly or refill set, which can be connected to the support frame 14 in a simple way. To that end, the end 36 of the wiper strip 24 remote from the spring clamp 16 is thrust into the support frame 14 in the manner already described; the retaining claws 22 grasp a portion of the head strip 26 and dip into the longitudinal grooves 34. When the free ends of the spring arms 64 and 66 now strike the retaining claws 22, they are deflected elastically in the direction of the arrow 73 (FIG. 11), under the influence of a runup incline 71 (FIG. 1) located in front of the hooks 70, so that, resting on the longitudinal side faces 32 of the head strip 26, they cross the retaining claws 22—because of the mounting plate present there—and resiliently return again to their position shown FIG. 11, counter to the direction of the arrow 73, and anchor the mounting or refill set 75 (FIGS. 2 and 3) on the support frame 14.

Thus the tension clamp 44 forms a means for positively retaining the spring rail 40 in the longitudinal channel 38 of the wiper strip 24. The tension clamp 44 also assures a secure connection of the spring clamp 60, acting as a securing means, to the wiper strip 24. To achieve a durable action of the tension clamp 44, this clamp is preferably made of a deformable metal.

It is optionally expedient for the tension clamp and spring clamp to be embodied as one single component. FIGS. 14–20 show such an embodiment with a combination part 135 that has a tension clamp 144, a spring clamp 160, and a guide clamp 168. The material to be used for the combination part 135 must on the one hand be stiff enough that the clamping function for the channel wall is performed, but on the other hand its elasticity must also enable the elastic deflection of the spring arms 164, 166 having the hooks.

Figure 19:
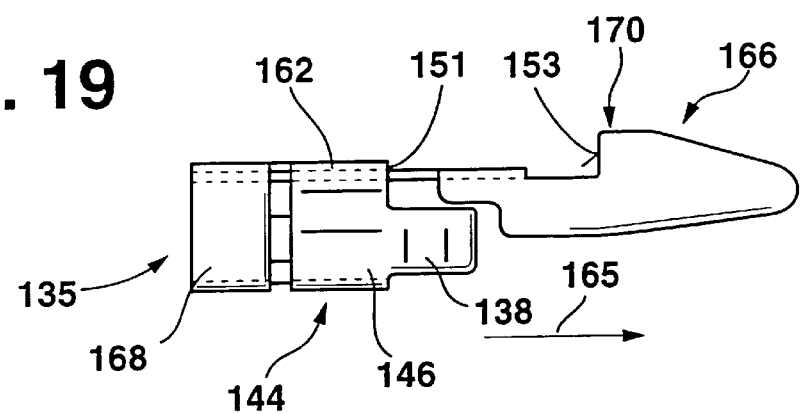
FIG. 19 is a side view of the combination.
Figure 20:
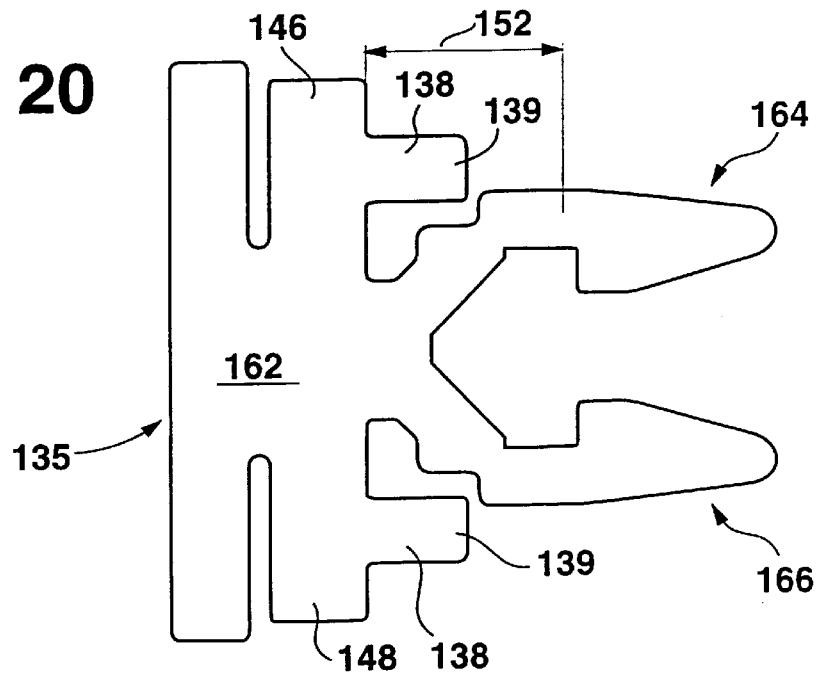
FIG. 20 shows the starting plate from which the combination part, made of metal, is bent.

The particular embodiment of the combination part 135 will first be described in conjunction with FIGS. 18–20, in which this part as an individual part is shown as if it were already joined to the wiper strip 24, ready for mounting. The combination part 135 has a platelike base part 162, which is part of a guide clamp 168 of a tension clamp 144 and a spring or securing clamp 160. All these clamps 168, 144, 160 have an at least approximately U-shaped cross section; the bar connecting the various legs of the U 146, 148 or extensions 172 or cheeks 164, 166 is formed by the common base part 162. The disposition of the tension clamp 144 on the combination part 135 is made such that its legs 146, 148, when the wiper blade 10 is mounted, are opposite the recesses 141 of the spring rail 140. Viewed in the mounting direction (arrow 165 in FIGS. 16 and 19), the combination part 135 has the guide clamp 168 in front of the arms 164, 166 of the spring clamp 160; this guide clamp assures proper guidance of the combination part 135 on the head strip 26. The tension clamp 144 is embodied between the arms 164, 166 of the spring clamp 160 and the guide clamp 168 on the kt 135; its legs 146, 148 take over the function of the legs 46, 48 of the tension clamp 44 of the embodiment (FIGS. 4–13) already described. Naturally, this also applies to the relations between the guide clamp 168 and the corresponding arrangement of the parts 72 and 62 (FIG. 7) and for the general embodiment and function of the spring clamp or securing clamp 160 with respect to the corresponding parts 62, 64 (FIGS. 5 and 6). In a departure from this, tabs 138 extending in the direction of the arrow 165 are formed onto the legs 146, 148 of the tension clamp 144; when the refill set 75 is mounted, the retaining claws 22, shown in dot-dashed lines in FIGS. 16 and 17, of the support frame fit over these tabs. As FIG. 16 shows, the clamped tension clamp 144, or its legs 146, 146, on the one hand press the lateral side walls 42 of the head strip 26 into the recesses 141 of the spring rail 140, so that the latter is positively retained in the longitudinal channel 38. At the same time, the securing means (spring clamp 160 and guide clamp 164) are secured on the wiper strip.

If the legs 146, 148 of the tension clamp 174 are tensed, then the tabs 138 are also pressed into the head strip 26. To eliminate the unavoidable mounting play between the head strip 26 and the inside of the retaining claws 22, the tabs 138 are bent outward, out of the plane of the legs 146, 148. In the course of their further length, in the region of their free ends 139, they each have inward-pointing runup faces 143, which serve as securing means in the longitudinal channel 38 and as an aid in insertion, for when the refill set 75 is thrust into the retaining claws 22 of the support bracket frame 14.

As a further special feature, the platelike base part 162 of the kt 135 is provided, in the region of the legs 146, 148 of the tension clamp 144, with two bulges 150, whose end edges 151 are oriented toward the hook 170 of the arms 164, 166. The spacing 152 between these end edges 151 of the bulge and the hook shoulder edge 153 is adapted in such a way to the length 154 of the retaining claw 22 that the claw is mounted virtually without play between the two edges 151 and 153 (FIG. 17).

Figure 18:
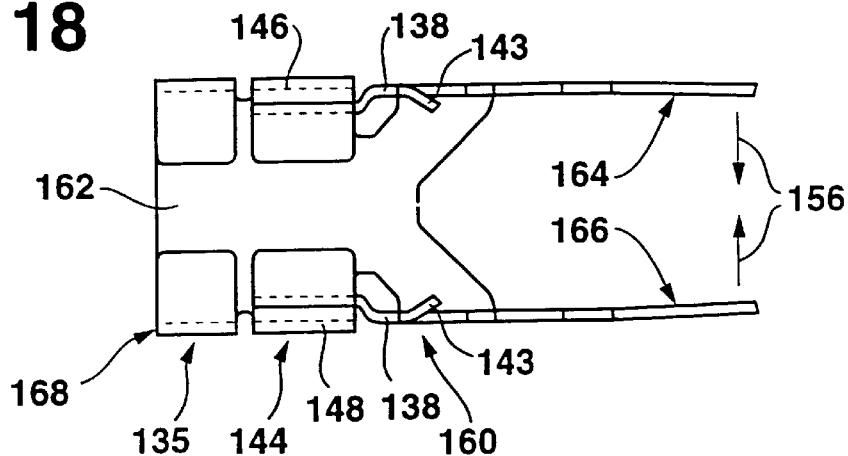
FIG. 18 is a plan view from below of a combination part that has both the spring clamp and the tension clamp.

Another pair of recesses 155 in the spring rail 140 enables the hooked arms 164, 166, which are prestressed against one another in the direction of the arrows 156 in FIG. 18, to dip into the contour of the strip 26, so that the arms 164, 166 are no obstacle with respect to the retaining claws 22 of the support bracket frame when the refill set 75 is mounted.

The refill set 75 is mounted as follows:

After the insertion of the spring rail 140 into the longitudinal channel 38 of the wiper strip 24, the kt 135 is thrust in the direction of the arrow 165 onto the head strip 26 far enough that the tension clamp 144, with its still-open legs 146, 148 (FIG. 15), rests above the recesses 141 of the spring rail 140, whose embodiment is equivalent to the spring rail 40 of the exemplary embodiment already described. By compressing the legs 146, 148 of the tension clamp 144 (FIG. 14), the lateral channel walls facing one another are pressed into the recesses 141 of the spring rail 40, and the spring rail is thus fixed in the channel. At the same time, the kt 135 is also fixed on the wiper strip 24, so that the refill set 75 is now ready for use.

To connect the refill set 75 with the support frame 14, this frame is inserted in the direction of the arrow 165 into the retaining claws 22 of the support frame 14 in such a way that the claws 22 engage the longitudinal grooves 34 of the wiper strip 24. These longitudinal grooves are also engaged by the legs 146, 148 of the tension clamp 144 and by the extensions 172 of the guide clamp 168. When the refill set 75, with the arms 164, 166 of the spring clamp 160, strikes a retaining claw 22 of the support frame during insertion, these arms deflect in the manner already described in conjunction with FIG. 11, and the retaining claw 22 enters a detent position, which is defined on both sides by the edges 151 and 153 of the kt 135. The refill set 75 is thus retained captive in the support frame, and the wiper blade is thus ready for operation.

We claim:

1. A wiper blade for cleaning window glass of motor vehicles, comprising an elongated support frame provided with retaining claws; an elongated wiper strip composed of an elastic material and having a head strip grasped by said retaining claws, said head strip being provided with a longitudinal channel which is closed around and opens at end faces of said wiper strip; a spring rail located in said longitudinal channel and fixed against longitudinal shifting; retaining means fixing said spring rail against the longitudinal shifting; means mounted on said wiper strip so as to cooperate with one of said (frame part and) claws to secure said wiper strip in captive fashion on said support frame, said spring rail being retained by a positive engagement in said longitudinal channel, said securing means being firmly connected to said wiper strip.

2. A wiper blade as defined in claim 1, wherein said spring rail has at least one longer side provided with a recess into which a channel wall adjacent to it protrudes.

3. A wiper blade as defined in claim 2; wherein said retaining means further comprises clamping means extending crosswise to a longitudinal extension of said wiper strip and pressing said channel wall into said recess.

4. A wiper blade as defined in claim 3; wherein said clamping means is formed as a clamp which at least intermittently grasps said head strip of said claw of said support frame.

5. A wiper blade as defined in claim 4, wherein said clamp is composed of a deformable metal.

6. A wiper blade as defined in claim 4, wherein said clamp includes a spring clamp integrally joined to a tension clamp to form a combination part, said tension clamp forming said retaining means said spring clamp having at least one elastically deflectable arm which crosses said at least one retaining claw of said support frame and engages said at least one retaining claw from behind with a hook provided on said arm.

7. A wiper blade as defined in claim 6, wherein said combination part has a platelike base part on which said at least one elastically deflectable arm of said spring clamp is disposed, said combination part as viewed in a mounting direction having a guide clamp preceding said at least one elastically deflectable arm, said tension clamp being located between said guide clamp and said arm of said combination part and at least intermittently grasps said head strip of said wiper strip, said tension clamp having legs extending substantially parallel to one another and pressing lateral channel walls facing one another into said recess of said spring rail.

8. A wiper blade as defined in claim 7, wherein each of said legs has one tab extending in the mounting direction and laterally embracing said head strip of said wiper strip, so that said retaining claws of said support frame fit over said tabs once a refill set has been mounted.

9. A wiper blade as defined in claim 7, wherein said tabs are curved outward out of a plane of said legs and have one inward-oriented runup face on each of free ends of said tabs.

10. A wiper blade as defined in claim 7, wherein said platelike base part of said combination part in a region of said legs of said tension clamp has at least one bulge with an end edge oriented toward said hook, so that a spacing between said end edge and a hook shoulder edge is adapted to a length of said at least one retaining claw of said support frame.

11. A wiper blade as defined in claim 1; and further comprising a platelike base part having one extension; and a cheek located in a plane in which said one extension of said platelike base part is located.

12. A wiper blade as defined in claim 1, wherein said securing means include a spring clamp integral with extensions, and an arm having a hook and composed of spring band steel.

13. A wiper blade as defined in claim 1, wherein said securing means include a spring clamp having two cheeks extending parallel to one another and adjacent to two side faces of said head strip, said cheeks forming two hook arms.

* * * * *